United States Patent
Mason

[15] 3,643,699
[45] Feb. 22, 1972

[54] TORQUE MOTOR OPERATED VALVE

[72] Inventor: Richard K. Mason, Granada Hills, Calif.
[73] Assignee: Textron, Inc.
[22] Filed: May 18, 1970
[21] Appl. No.: 37,985

[52] U.S. Cl. ...................... 137/625.64, 137/87, 137/625.65
[51] Int. Cl. .............................................. G05d 16/20
[58] Field of Search ................ 137/98, 100, 101.19, 111, 87, 137/454.6, 102, 625.64, 625.65; 91/459; 260/211.5

[56] References Cited

UNITED STATES PATENTS

| | | | |
|---|---|---|---|
| 3,584,649 | 6/1971 | Cobb | 137/625.64 |
| 3,857,617 | 6/1971 | Olsen | 137/625.64 |
| 3,395,890 | 8/1968 | Eckert | 137/625.65 |
| 3,555,969 | 1/1971 | Shah | 137/625.64 |
| 3,000,363 | 3/1961 | Hayner | 187/625.64 |

Primary Examiner—Samuel B. Rothberg
Assistant Examiner—William H. Wright
Attorney—Nilsson, Robbins, Wills & Berliner

[57] ABSTRACT

A valve slidably disposed within a bore and movable between first and second positions to control application of a source of fluid under pressure between an inlet and outlet port. An electrically operated torque motor is connected to the valve to drive the valve in response to an electrical signal applied to the torque motor. The valve is connected to a system and is responsive to a discrepancy between a control and monitor section of the system to effectively lock the system in a failure indicating mode of operation.

8 Claims, 5 Drawing Figures

ELECTRICAL SIG. "OFF"
HYDRAULIC PRESS. "ON"

INVENTOR.
RICHARD K. MASON
BY
Nilsson, Robbins, Wills & Berliner.
Attorneys.

ELECTRICAL SIG. "ON"
HYDRAULIC PRESS. "OFF"

ELECTRICAL SIG. "OFF"
HYDRAULIC SIG. "OFF"

ELECTRICAL SIG. "ON"
HYDRAULIC PRESS. "ON"

INVENTOR.
RICHARD K. MASON.
BY
Nilsson, Robbins, Wills & Berliner.
Attorneys.

TORQUE MOTOR OPERATED VALVE

BACKGROUND OF THE INVENTION

1. Field of the Invention

This invention relates to fluid handling systems and more particularly to valves for utilization in such systems.

2. The Prior Art

In various applications to the prior art, it becomes necessary to compare signals present within various portions of a redundant control system to determine coincidence therebetween. If there is noncoincidence, then immediate switching must occur to transfer operation of the system from a failed to an operable part of the system. See, for example, U.S. Pat. Nos. 3,391,611 and 3,406,702. Although apparatus of the type disclosed in these two patents operates exceedingly well, it should be noted that upon detection of a discrepancy a spool valve must move and thereby displace substantial amounts of fluid to effect the desired operation. Such structure also obviously requires sliding parts with close fits. Thus, it can be seen that the operation of the apparatus is slowed by the structure thereof and the expense of manufacture is quite high.

Under certain circumstances, where failure of a portion of the system was to be detected and a particular function effected responsive thereto, a solenoid operated valve can be utilized. For example, see U.S. Pat. Nos. 2,826,215 and 3,426,792. Although solenoids do operate in the manner described therein quite satisfactorily, it has been found that the response thereof is slower than desired and the reliability thereof is less than desired for applications in accordance with the present invention.

SUMMARY OF THE INVENTION

A torque motor operated valve which includes a valve member movably disposed within a bore having an inlet and an outlet to provide communication between the inlet and outlet in a controlled fashion in response to application of an electrical signal to an electrically operated torque motor which is operatively interconnected with the valve member.

DESCRIPTION OF THE DRAWINGS

Referring to FIG. 1, there is illustrated a control valve 11 which functions to control the flow of fluid from a source 12 thereof through a pair of conduits 13, 14 to position an actuator or other device to be positioned in accordance with a command electrical signal applied to the terminals 15. Also illustrated is a monitor 16 which has substantially the same electrical signal applied to its terminals 17. Appropriate means connected to the valves functions to compare the signals produced by the control valve 11 with the signals produced by the monitor 16 to determine any discrepancy therebetween.

Figure 1:
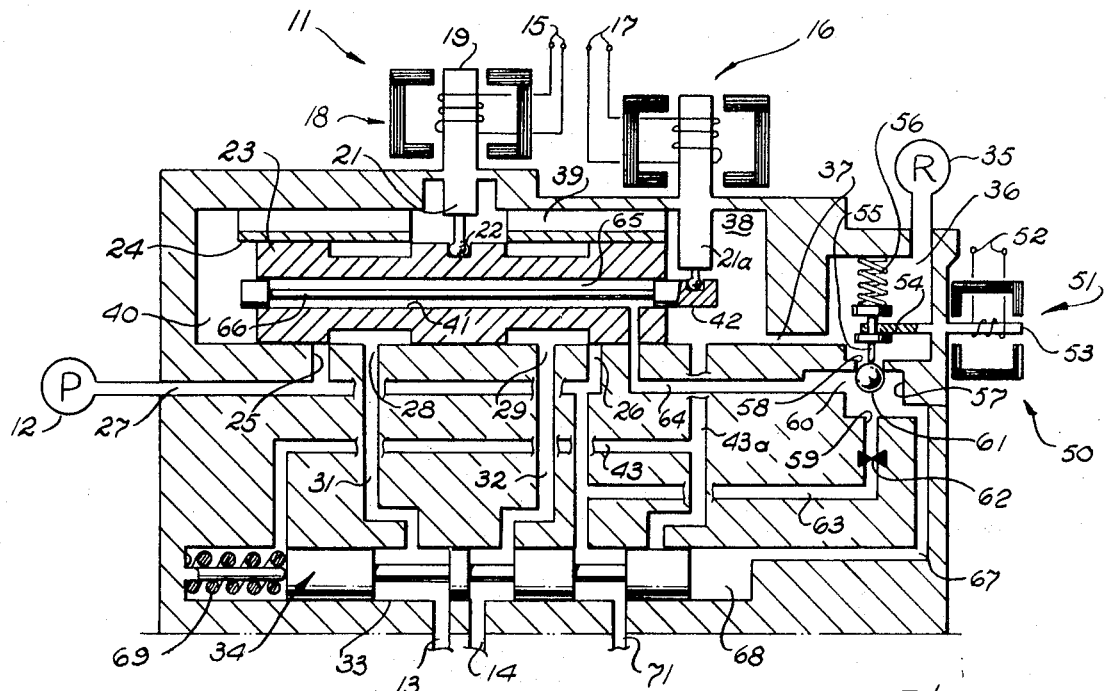
FIG. 1 illustrates schematically one form of a system utilizing the torque motor operated valve of the present invention.

The control valve 11 includes an electrohydraulic servovalve having a torque motor 18 of a type well known to the prior art which includes an armature 19 connected to a flapper 21 which is positioned at its terminal end 22 in a groove provided therefor in the spool valve 23. The spool valve 23 is positioned slidably within a bore 24 having ports 25 and 26 connected by way of the conduit 27 to the source of fluid under pressure 12. Also provided in the bore 24 are ports 28 and 29 which are connected respectively through conduits 31 and 32 to a bore 33 within which is positioned a spool valve 34 which controls application of the fluid to the conduits 13 and 14. Return or reservoir of the source of pressure 12 is illustrated at 35 and is connected to a chamber 36 which in turn is connected through a passageway 37 to the chamber 38, which in turn is connected through the passageway 39 to the chamber 40. Conduits or passageways 43a and 43 also connect system return to the bore 33 as illustrated.

During normal operations as signals are applied to the terminals 15, the flapper 21 moves the control valve 23 within the bore 24 to thereby uncover either port 25 or 26 thereby exposing it to the source of pressure 12 causing the same to be connected through conduits 31 or 32 and through the bore 33 to the conduits 13 and 14. At the same time, the control valve 23 will connect system return by exposing conduit 31 or 32 to the passageway 39, depending upon direction of movement of valve 23, to permit a flow of fluid through the conduit 13 or 14 to return 35. During the same period of time, the identical signal is being applied to the terminal 17 of the monitor 16 thereby causing the flapper 21a to position the comparator spool 42. As is noted, the comparator spool 42 is slidably disposed within a bore 41 provided through the control spool 23. So long as the flapper 21a tracks the flapper 21, the comparator spool 42 tracks the control spool 23.

In the event, however, a discrepancy occurs between the control and monitor signals, it is desired to detect the same and to disable the control valve 11 as is thoroughly described in the above referenced patents. Thus, there is provided a torque motor operated valve shown generally at 50. The valve includes a torque motor 51 having terminals 52 to which may be applied an electrical signal to cause the armature 53 to move up or down (as viewed in FIG. 1) responsively thereto depending upon the polarity and value of signal applied. Such torque motors are well known to the art, and therefore will not be described in detail herein. A flapper 54 is in turn moved by the movement of the armature 53. As is illustrated, the flapper 54 is operatively connected to a rod 55 which is engaged by a spring 56 which continuously urges the rod 55 in a downward direction as shown in FIG. 1. As is illustrated in FIG. 1, there is defined a bore 57 having inlets 58 and 59 and an outlet 60. A valve member such as ball valve 61 is movably disposed within the bore 57 so as to move between the inlets 58 and 59 and to engage valve seats positioned at the inlets thereby alternately blocking inlet port 58 or inlet port 59. As is illustrated, inlet port 58 is connected to the chamber 36 which is in turn connected to system return 35. Inlet port 59 is connected through a restriction orifice 62 and a conduit 63 to source 12 of fluid under pressure. As is also illustrated, outlet 60 from the bore 57 is connected by conduit 64 to the space 65 provided by the reduced diameter rod 66 of the comparator 42. The end sections of the comparator 42 which are connected to the rod 66 provided between the space 65 and the chamber 38 during normal operation of the type above described.

It should also be noted that conduit 67 is connected to the bore 57 thereby connecting fluid under pressure as it exists downstream of the restriction orifice 62 to the chamber 68 thereby maintaining the spool valve 34 in the position illustrated against the force provided by the spring 69. If desired, a pressure indicating device may be connected to the conduit 71 to provide an indicating apparatus with a pressure signal indicative of proper operation or failure of the system as shown.

As illustrated in FIG. 1, the system pressure causes the ball 61 to be seated against the seat associated with the input port 58 thereby causing system pressure to appear within the space 65 and the chamber 68 as described. However, in the event of a discrepancy between the monitor and the control, such that the comparator 42 is moved sufficiently to cause the enlarged end portions thereof to open the bore 41 to the chamber 38, system return is immediately connected through the conduit 64 to the bore 57. With the restriction orifice 62 positioned between the bore 57 and the source of pressure, an immediate pressure drop occurs precluding the maintenance of system pressure against the ball 61. Spring 56 immediately moves the ball 61 downwardly into engagement with a valve seat associated with the inlet or input port 59 thus sealing system pressure from the bore 57. At the same time, inlet 58 is now completely open and system return is communicated directly to the bore 57. The force of the spring 56 is sufficient to overcome the force provided by system pressure acting against the ball 61 at the inlet 59. Thus, when actuated to this position, the ball 61 is latched in place.

With the ball 61 sealing system pressure from the bore 57 and providing system return thereto, the force of the spring 69 moves the slide valve 34 to the right, as shown in FIG. 1, thereby interconnecting the conduits 13 and 14 and blocking the conduits 31 and 32 thereby preventing the flow of fluid therethrough from the source 12 thereof. A more detailed understanding of the construction and operation of the torque motor operated valve 50 can be had by reference to FIGS. 2 and 3.

Figure 2:
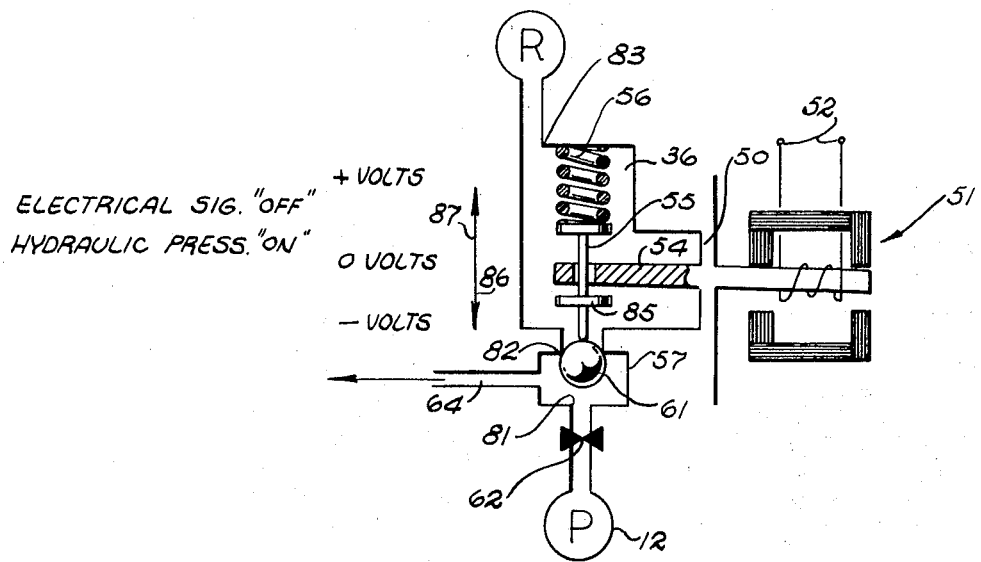
FIGS. 2 through 5 illustrate, in schematic form, a torque motor operated valve in accordance with the present invention, in various operative positions thereof.

The ball 61 is shown seated against the valve seat 82 in FIG. 2 which is the same position it occupies in FIG. 1. As is more clearly illustrated in FIG. 2, the spring 56 is seated against one wall 83 of the housing with the opposite end of the spring being seated against a button 84 which is connected to the rod 55 at the upper portion thereof. The opposite end of the rod 55 engages the ball 61. Intermediate the ends is a second button 85. Positioned intermediate the buttons 84 and 85 is the end of the flapper 54. The flapper 54 is moved up or down by application of appropriate signals to the torque motor 51. The flapper is mounted on spring 50 which may also apply forces thereto and affect operation of the valve as will be more fully explained hereinafter.

Figure 3:
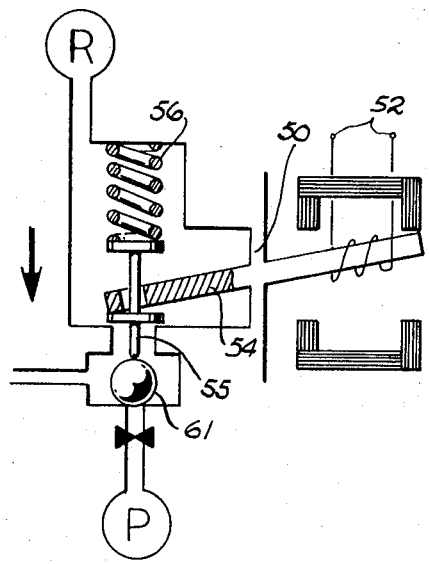

Thus, with the ball 61 seated against the valve seat 82, thereby blocking communication of system return to the conduit 64 and upon application of a signal having appropriate polarity such, for example, as a negative voltage, the flapper 54 is caused to move downwardly as indicated by the arrow 86 and shown in FIG. 3. Such downward movement causes the flapper 54 to engage the button 85 and apply a force to the rod 55. Such force may be of sufficient magnitude to overcome the force exerted against the ball 61 by the source of pressure 12 being applied thereto. When the ball 61 is moved away from the seat 82, system return is immediately communicated to the bore 57 and the conduit 64. In the event the flapper movement is not sufficient, when ball 61 moves from seat 82, the spring 56 is permitted to immediately translate the ball 61 into engagement with the seat 81 thereby blocking communication of system pressure with the bore 57 as above described. Thus, it can be seen that by application of an electrical signal to the torque motor 51, the valve can be actuated to render the control of the system ineffective.

Figure 4:
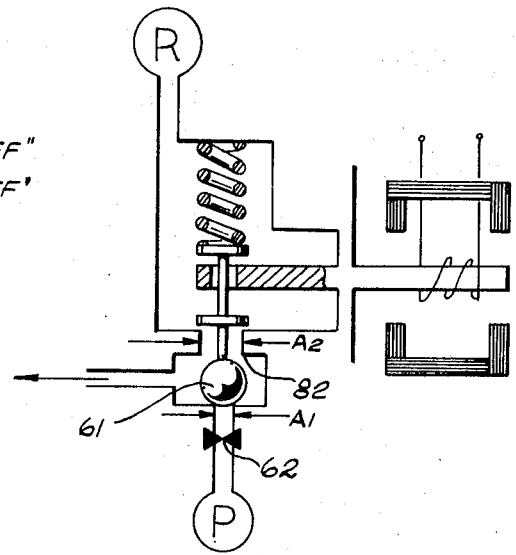

As is clearly shown in FIG. 3, the spring 50 has been stressed by application of the negative electrical signal to the torque motor 51. Upon removal of the negative electrical signal, the spring 50 will cause the flapper to return to its neutral position as shown in FIG. 4. However, the force of spring 56 maintains the rod 55 and ball valve 61 in the position shown.

As is more clearly illustrated in FIG. 3, the effective area of the inlet port 58 is greater than the effective area of the inlet port 59. In this manner, the force provided by the spring 56 can be selected so that the combination of the area of the inlet 59 and system pressure does not provide sufficient force to overcome the force of the spring 56 when the ball 61 is seated against the valve seat 81. However, the effective area of the inlet port 82 is chosen such that when the ball is seated thereagainst and system pressure is acting upon the ball, the force thus created is greater than the force generated by the spring 56 thereby enabling the ball 61 to remain seated against the valve seat 82 until an electrical signal is applied to the torque motor, or the pressure within the bore 57 is reduced sufficiently by a failure of system. Such is indicated by the differences in the inlet openings and designated by the symbol $A_1$ and $A_2$.

The spring 50 may be utilized to spring bias the flapper 54 downward into the position shown in FIG. 3. Such bias would cause the system to automatically shut down in the event of a power failure by moving to the downward position when no electrical signal is applied to the torque motor 51. Obviously under such circumstances, the neutral position of the flapper, as shown in FIGS. 2 and 4, would be achieved by application of an electrical signal to torque motor 51 of sufficient magnitude to overcome the force of the bias provided by the spring 50.

Figure 5:
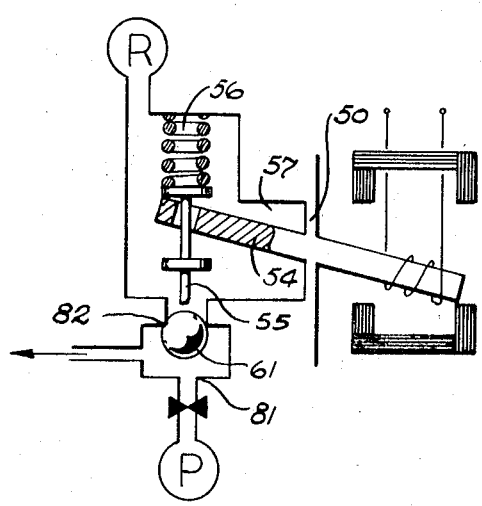

If it is desired to reactivate the system, then by application of a positive voltage the armature operates in such a way as to move the flapper 54 upwardly as indicated by the arrow 87 and shown in FIG. 5 thereby engaging the button 84 and applying a force sufficient to overcome the force of the spring 56 thus causing the rod 55 to leave engagement of the ball 61. When such occurs, the ball 61 is moved by system pressure away from its engagement with the valve seat 81. System pressure will apply sufficient force to cause the ball 61 to translate into engagement with the valve seat 82 thereby sealing system return from the bore 57. After a period of time sufficient to permit system pressure to stabilize within the bore 57 and the remainder of the system connected thereto, the electrical signal can be removed from the torque motor 51 (or reduced) thereby permitting the flapper 54 to return to the neutral position with the force of the spring 56 being applied to the ball 61 as illustrated in FIG. 2.

A torque motor operated valve in accordance with the present invention operates in two directions thus providing greater versatility with less equipment than heretofore possible. Through utilization of the structure as shown relatively small parts are utilized thereby providing faster acting valves than heretofore possible.

What is claimed is:

1. A torque motor operated valve comprising:
   means defining a bore having an inlet and an outlet;
   a valve seat in said bore;
   a valve movably disposed in said bore and operable with said valve seat to block communication between said inlet and outlet;
   an electrically operated torque motor;
   stiff flapper means interconnecting said torque motor and said valve and movable in first and second directions responsive to electrical signals applied to said torque motor for driving said valve.

2. A torque motor operated valve as defined in claim 1 which further includes a poppet, a rod member in engagement with said poppet and said flapper, whereby said poppet moves responsive to movement of said flapper.

3. A torque motor operated valve as defined in claim 2 which further includes spring means continuously urging said rod member into engagement with said poppet.

4. A torque motor operated valve comprising:
   means defining a bore having first and second inlets and an outlet;
   first and second valve seats in said bore;
   a valve disposed in said bore movable between said first and second seats thereby to provide communication between said first or said second inlet and said outlet;
   an electrically operated torque motor;
   a rigid flapper driven in first and second directions by said torque motor;
   a rod member engaging said valve and said flapper; and
   spring means continuously urging said rod into engagement with said valve and said valve toward said first inlet, whereby said flapper aids said spring means in one direction and resists said spring means in the other direction.

5. A torque motor operated valve as defined in claim 4 which further includes first and second sources of fluid under pressure connected to said first and second inlets respectively, and said first and second valve seats are dimensioned to provide a force acting upon said valve which is greater than the force of said spring when said valve is seated upon said first valve seat.

6. A torque motor operated valve as defined in claim 4 which further includes second spring means connected to said flapper for urging said flapper in a direction opposite that to which it has been moved by said torque motor.

7. A torque motor operated valve as defined in claim 2 wherein said rod member is angularly disposed with respect to said flapper.

8. A torque motor operated valve as defined in claim 7 wherein the engagement between said flapper and said rod member is a loose engagement.